United States Patent [19]

Nisper

[11] 4,099,730
[45] Jul. 11, 1978

[54] PISTON RING CONSTRUCTION

[75] Inventor: Kenneth J. Nisper, Spring Lake, Mich.

[73] Assignee: Questor Corporation, Toledo, Ohio

[21] Appl. No.: 802,179

[22] Filed: May 31, 1977

[51] Int. Cl.² .............................. F16F 1/34; F02F 5/00
[52] U.S. Cl. .................................... 277/139; 267/1.5; 277/143; 277/218
[58] Field of Search .............. 277/9, 9.5, 11, 138–140, 277/143, 154, 155, 192, 199, 200, 218–221; 267/1.5

[56] References Cited

U.S. PATENT DOCUMENTS

| 2,111,258 | 3/1938 | Zahodiakin | 267/1.5 |
| 2,162,555 | 6/1939 | Kurth | 277/143 |
| 3,000,677 | 9/1961 | Thomas et al. | 267/1.5 |
| 3,136,559 | 6/1964 | Hamm | 277/139 |
| 3,598,419 | 8/1971 | Nisper et al. | 277/219 |
| 3,615,098 | 10/1971 | Sugahara | 277/143 |
| 3,787,059 | 1/1974 | McCormick | 277/9 X |
| 3,814,409 | 6/1974 | Prasse | 267/1.5 |

FOREIGN PATENT DOCUMENTS

| 650,865 | 10/1962 | Canada | 277/143 |
| 907,089 | 8/1972 | Canada | 277/218 |

Primary Examiner—Robert S. Ward, Jr.
Attorney, Agent, or Firm—Harry O. Ernsberger

[57] ABSTRACT

The disclosure embraces a piston ring construction particularly an oil control ring construction comprising a parted oil control ring or rings and a parted compressible spacer-expander ring or spring member, the spacer-expander member configurated with strut portions, pairs of the strut portions having their end regions integrally joined by connectors, the connectors being formed with inwardly extending portions, the spacer-expander member being arranged to exert substantially uniform outward radial pressure against one or more oil control rings, the spacer-expander member being adapted to accommodate a latch member for bridging the ends of the member.

11 Claims, 9 Drawing Figures

U.S. Patent
July 11, 1978
4,099,730
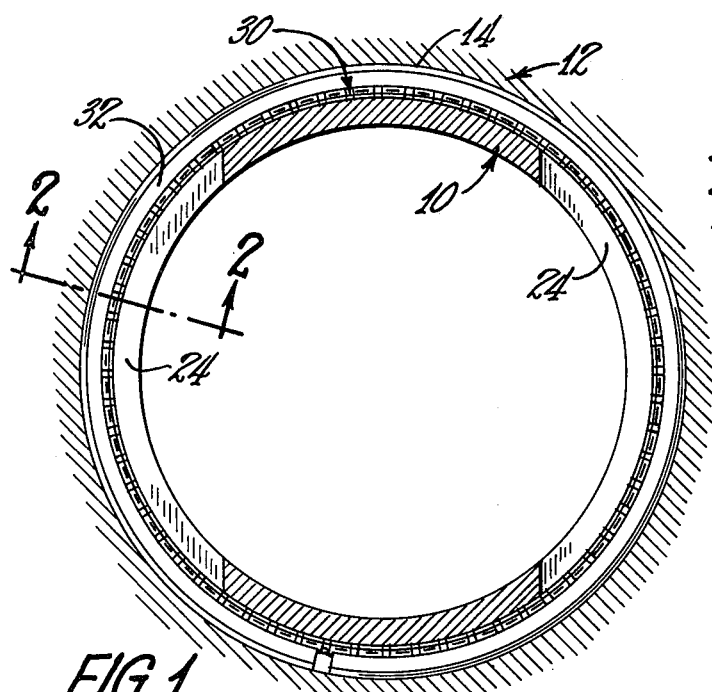
FIG. 1
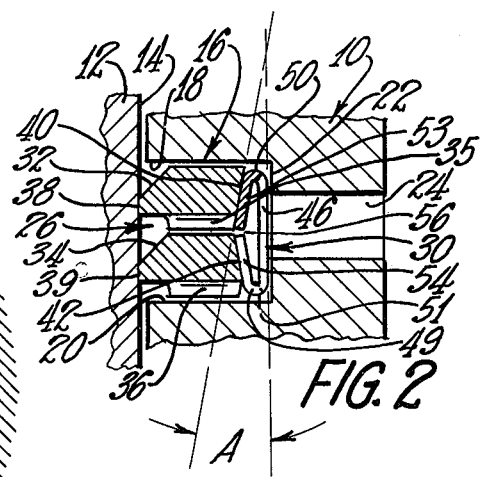
FIG. 2
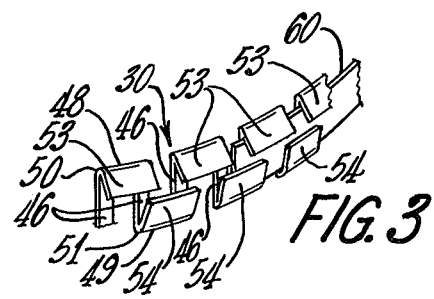
FIG. 3
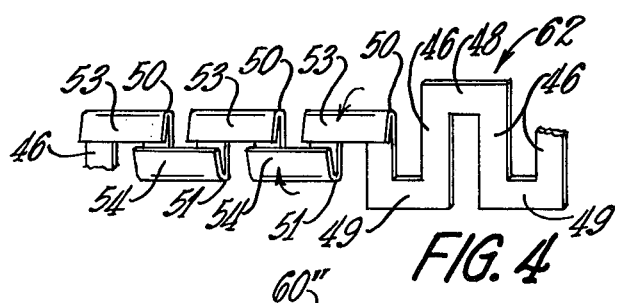
FIG. 4
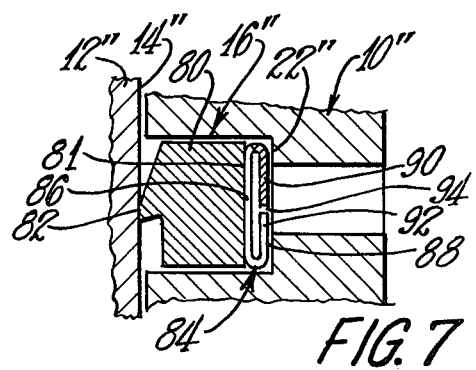
FIG. 7
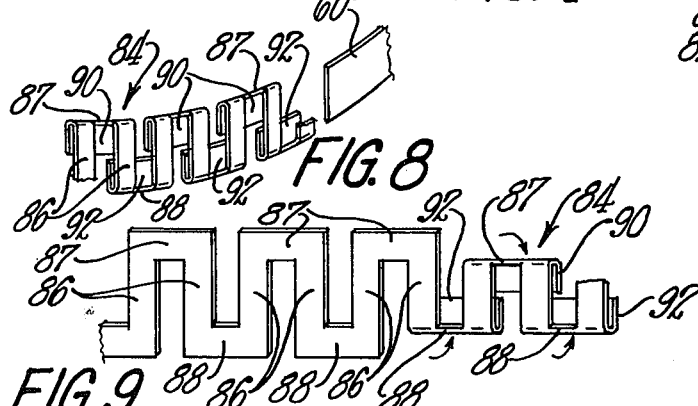
FIG. 8
FIG. 9
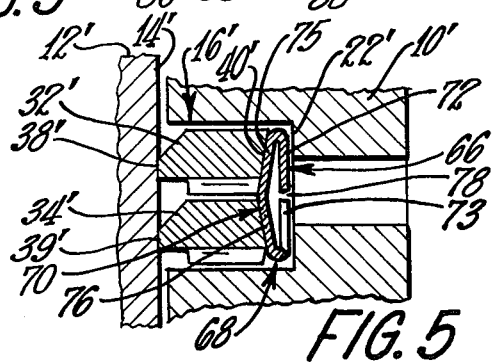
FIG. 5
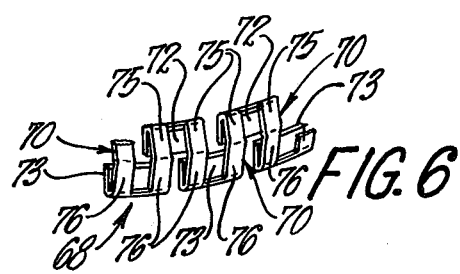
FIG. 6

PISTON RING CONSTRUCTION

The invention relates to a piston ring construction particularly for use as an oil control ring construction for reciprocating piston engines of the heavy duty types and diesel types, the invention particularly embracing a spacer-expander ring construction for use with cast iron oil control or oil sealing rings.

Several types of compressible spacer-expanders have been used in association with cast iron rings but such spacer-expanders have deficiencies which render assembly difficult or which impair the efficiency of the oil control sealing rings with which the spacer-expanders are used. There are three general types of spacer-expanders that have been heretofore used with cast iron rings, such types being usually referred to as the equalizer type, the helical compression spring type and an expander type of U-shaped cross section.

The equalizer type of spacer-expander comprises a strip of metal formed into undulated or wavy configuration wherein the undulations are in axial directions of the spacer-expander. One of the difficulties in the use of the equalizer type of spacer-expander is the tendency for the ends to overlap at installation. When this occurs without being detected, there can be severe impairment of the operation of the spacer-expander. For example, the spacer-expander does not exert radial outward pressures on the oil control sealing ring and hence the sealing ring does not perform its function of controlling oil.

In some instances there is insufficient space in the piston groove for the overlapped spring and the cast iron ring resulting in the spring becoming crushed or broken and the cast iron ring and expander spring locked in place exerting pressure on the cylindrical wall which can cause severe scoring of the cylindrical wall. The equalizer type has substantially no resilience in radial directions.

If the equalizer type of expander is not coiled to a true circle, it may promote uneven pressures and an uneven wear pattern against the inside diameter of the cast iron ring. Such uneven pressures are transmitted to the outside diameter of the cast iron oil ring causing uneven wear and hence ineffective oil control. As the equalizer type is undulated in an axial direction of the ring, it is quite flexible in such direction.

When it is compressed there is a tendency for the expander to contact the side of the groove in the piston setting up excessive friction impairing the performance of the expander to exert proper pressure on the cast iron oil control ring. Furthermore, a latch member cannot be used at the ends of the ring because of the undulated configuration.

Spacer-expanders of the coil spring type have been used but such spacer-expanders are unsatisfactory in several respects. The coil spring tends to score the inside surface of the oil control ring and this impairs the radial outward pressure of the spring against the oil control ring. Coil spring expanders are fashioned with closely spaced convolutions which tend to inhibit ventilation through vent openings in the control ring or vents in the ring groove opening into the interior of the piston.

The spacer-expander of U-shaped cross section is usable with a single cast iron oil control ring but it is not readily adaptable for use with two oil control rings where it is desired to resiliently bias both rings outwardly with uniform pressures against the cylinder wall.

The present invention embraces the provision of a piston ring construction embodying a parted circumferential spacer-expander or spring member associated with a piston sealing ring or rings, the spacer-expander being fashioned of a strip of thin metal and configurated to provide radially acting biasing pressures against a piston sealing ring or rings so that a substantially uniform engagement of the piston rings with the cylindrical wall is attained to provide a highly efficient and effective oil control ring construction.

The invention has for an object the provision of a piston ring construction embodying a parted spacer-expander or spring member having inwardly bent portions providing radial resiliency for biasing a piston ring or rings into effective sealing engagement with a cylinder wall wherein the outward biasing pressures are substantially uniform throughout the circumference of the spacer-expander and wherein the inwardly bent portions provide a construction adapted to receive or accommodate a latch member bridging the ends of the spacer-expander member to facilitate installation in the ring groove in a piston.

Another object of the invention resides in a piston ring construction wherein a parted circumferential spacer-expander or spring is fashioned with portions disposed at acute angles with respect to the axis of the ring construction providing effective outward radial biasing pressures against two oil control rings which are substantially uniform throughout the circumference of the ring construction.

Another object of the invention resides in a piston ring construction embodying a parted circumferential spacer-expander or spring means fashioned of thin strip metal or metal ribbon formed to provide strut sections joined at their end regions with connectors, the connectors having inwardly bent portions, the strut sections and the inwardly bent portions being arranged to provide ample vent spaces throughout the circumference of the spacer-expander or spring means.

Another object of the invention is the provision of a piston ring construction embodying a parted circumferential spacer-expander spring member configurated with strut sections and connector sections, the connector sections having inwardly bent portions, the strut sections and the inwardly bent portions providing radially outwardly biasing pressures against two sealing rings whereby outwardly biasing pressures are substantially uniform throughout the circumference of the spacer-expander spring member, the spaces between the strut sections and the inwardly bent portions accommodating a latch member bridging the ends of the spacer-expander spring member.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a transverse sectional view through a piston normal to its axis at the oil control ring groove illustrating a form of ring construction of the invention in a ring groove;

FIG. 2 is a greatly enlarged fragmentary sectional view taken substantially on the line 2–2 of FIG. 1;

FIG. 3 is a fragmentary isometric view illustrating the spacer-expander construction of FIG. 2 in association with a latch member;

FIG. 4 is a fragmentary view of a perforated and formed strip of thin metal illustrating the formation of the configuration of spacer-expander shown in FIGS. 2 and 3;

FIG. 5 is a view similar to FIG. 2 illustrating a modified form of spacer-expander member of the invention;

FIG. 6 is a fragmentary isometric view of a portion of the spacer-expander shown in FIG. 5;

FIG. 7 is a view similar to FIG. 2 illustrating a modified form of spacer-expander member of the invention in association with a single sealing ring;

FIG. 8 is a fragmentary isometric view of the spacer-expander shown in FIG. 7 in association with a latch member, and FIG. 9 is a fragmentary view of a perforated and formed strip of metal illustrating the formation of the spacer-expander shown in FIG. 8.

Referring to the drawings and initially to FIGS. 1 and 2, there is illustrated in cross section a cylindrical skirt portion of a reciprocating engine piston 10 and a portion of a cylinder 12 having a cylindrical bore 14 accommodating the piston 10. The piston 10 is equipped with conventional compression rings (not shown) disposed in conventional grooves in the piston.

The piston 10 is provided with a circumferential ring groove 16 which accommodates an oil control ring construction and a form of spacer-expander or spring member of the invention. The ring groove 16 is defined by an upper wall 18, a lower wall 20 in parallelism therewith and a cylindrical back or bottom wall 22. Oil drainage vent openings or slots 24 extend from the back wall 22 to the interior of the skirt portion of the piston for accommodating flow of oil from the ring groove 16 to the interior of the piston.

The oil control ring assembly 26, as shown in FIGS. 1 and 2, is of a three-piece construction comprising a parted spacer-expander ring or spring member 30 and two oil control or sealing rings, viz. upper and lower parted oil control rings or ring segments 32 and 34. The rings or ring segments 32 and 34 are preferably fashioned of cast iron but may be made of other metals.

The sealing rings 32 and 34 are respectively configurated to provide portions 38 and 39 of restricted area for sliding engagement or contact with the cylindrical surface of the cylinder bore 14. The lower regions of each of the rings 32 and 34 are provided with circumferentially-spaced radially extending vent openings or grooves 35 and 36 for venting oil to the slots 24 in the piston skirt.

Disposed between the inner surfaces 40 and 42 of the respective sealing rings 32 and 34 and the cylindrical back or bottom wall 22 of the ring groove 16 is the spacer-expander ring or spring member 30 as shown in FIG. 2. The spacer-expander ring 30 and its method of fabrication are more specifically illustrated in FIGS. 3 and 4.

In the embodiment illustrated in FIGS. 1 through 4, the spacer-expander ring or spring member 30 includes vertically-arranged struts 46, pairs of the struts being joined at their respective end regions by connectors or connecting portions 48 and 49 which are bent as at 50 and 51 providing inwardly bent portions 53 and 54. As shown in FIGS. 2 and 3, the upper circumferentially-spaced inwardly extending portions 53 are arranged at acute angles with respect to the vertical struts 46.

The portions or projections 54 of the lower group are bent inwardly toward the other bent portions and are arranged at acute angles with respect to the struts 46. The ends or terminals of the inwardly bent portions or projections 53 and 54 do not overlap but are spaced apart as indicated at 56 in FIG. 2. The bent portions are in spaced relation with the struts 46 as shown in FIGS. 3 and 4.

While the degree of acute angularity of the inwardly extending portions 53 and 54 with respect to the struts 46 may be varied depending upon particular wedging or biasing characteristics desired, it is found that the angularity indicated at "A" of the projections with respect to the vertical struts 46 should be between 5° and 25° and preferably of an angularity of about 15°.

The inner surfaces 40 and 42 of the respective oil control rings 32 and 34 are preferably of reciprocal angularity substantially the same as or contiguous with the angularity of the projections or portions 53 and 54, as shown in FIG. 2. The cross sectional configuration of the spacer-expander ring or spring member 30 provides for substantially uniform outward radial pressures against the oil control rings 32 and 34 throughout their circumferences.

As illustrated in FIG. 3, the spaces between the struts 46 and the angular portions 53 and 54 at the parting region of the spacer-expander accommodate a latch member 60. The latch or connecting member may be fashioned of a strip of plastic such as nylon or it may be made of thin metal. One end region of the latch member, as shown in FIG. 3, extends into one end of the parted expander and is anchored in a conventional manner in the said one end of the expander.

The latch member 60 extends into spaces between the vertical struts 46 and the angular portions or projections 53 and 54 at the other end of the expander and is slidable therein and bridges the ends of the parted ring to facilitate installation in the piston ring groove 16.

An important feature of applicant's spacer-expander construction is that it accommodates a latch member without any impairment of the radially outward expansive characteristics of the spacer-expander spring. The angularity of the portions 53 and 54 exert biasing forces to urge the respective oil control rings 32 and 34 toward the upper and lower walls 18 and 20 of the groove 16 in the piston.

FIG. 4 shows the configuration of a stamped, die cut or perforated blank 62 illustrating a method of forming the spacer-expander 30 of the construction shown in FIGS. 1 through 3. A strip or ribbon of thin metal is die cut or perforated to form the circumferentially spaced pairs of struts 46 integrally joined by connectors 48 and 49. The connectors are bent to the configuration shown at the left portion of FIG. 4 and in FIGS. 2 and 3, forming the upper row of projections 53 and the lower row of projections 54. Thus, it will be apparent that the formation of the spacer-expander 30 requires a minimum of processing steps in attaining its completed configuration.

The oil control ring and spacer-expander construction 30, shown in FIGS. 1 through 3, provides for substantially uniform outwardly directed radial pressures of the spacer-expander ring 30 against the parted oil control rings or ring segments 32 and 34 to establish and maintain an effective sealing engagement of the peripheral surfaces of the oil control rings with the cylinder bore surface 14. The configuration of the spacer-expander 30 provides substantial open areas for venting oil to the vents 24 in the piston skirt.

FIGS. 5 and 6 illustrate a modified form of spacer-expander construction of the invention. The spacer-expander oil control ring construction 66 includes a parted spacer-expander member or spring 68 and upper and lower cast iron oil control rings or ring segments 32' and 34' contained within a ring groove 16' in a piston 10', the rings 32' and 34' being in engagement with the cylinder bore surface 14'.

In the arrangement shown in FIGS. 5 and 6, the struts 70 of the spacer-expander 68 are arranged for engagement with the oil control rings 32' and 34' and the inwardly extending portions or projections 72 and 73 are in vertical relation as shown in FIG. 5. The struts 70 comprise upper portions 75 and lower portions 76 arranged at acute angles with respect to the inwardly extending portions 72 and 73, each pair of the angular portions 75 and 76 being integrally joined as single struts, as particularly shown in FIG. 6.

The exterior surfaces of portions or projections 75 of the upper row are in contiguous engagement with the angular surfaces 40' of the upper oil control ring 32', and projections or portions 76 of the lower row in contiguous engagement with the angular surfaces 42' of the lower oil control ring 34'. The inwardly extending portions or projections 72 and 73 are not in overlapping relation, the ends being spaced as indicated at 78.

In this form, each of the struts 70 is fashioned with two acute angular connected portions 75 and 76 which are in engagement respectively with the oil control rings 32' and 34', the inwardly extending portions or projections 72 and 73 being in substantial parallelism with the bottom wall 22' of the ring groove 16'. The expansive characteristics of the spacer-expander ring 68 bias the circumferential exterior surfaces 38' and 39' of the cast iron oil control rings 32' and 34' into engagement with the surface of the cylinder bore 14'.

The construction shown in FIGS. 5 and 6 provides spaces between the angular portions of the struts 70 and the inwardly extending portions or projections 72 and 73 to accommodate a latch member of the character illustrated at 60 in FIG. 3 for bridging the ends of the parted spacer-expander 68. The construction shown in FIGS. 5 and 6 functions in a manner similar to the functioning of the construction shown in FIGS. 2 and 3.

FIGS. 7 and 8 illustrate a modified form of spacer-expander or spring especially adapted for use with a single cast iron oil control ring 80 disposed in a ring groove 16" in a piston 10", the ring 80 having a restricted peripheral region 82 for engagement with the surface of a cylindrical bore 14" of a cylinder 12". Disposed between the ring 80 and the base or bottom wall 22" of the ring groove is a spacer-expander or spring 84, a portion of the spacer-expander or spring 84 illustrated in FIG. 8. The method of configurating the spacer-expander 84 is illustrated in FIG. 9.

The spacer-expander 84 comprises vertical struts 86, pairs of the struts being integrally joined at their upper ends by connectors 87 and the lower ends of the struts integrally joined by connectors 88. In this form the struts 86 are parallel with the axis of the piston. The connectors 87 have portions or projections 90 bent inwardly in parallelism with the struts 86. The connectors 88 have portions or projections 92 bent inwardly in parallelism with the struts 86, the portions 92 being in substantially vertical alignment circumferentially with the inwardly extending portions 90.

The portions 90 of the upper row and the portions 92 of the lower row do not overlap but are separated by spaces, one of which is indicated at 94 in FIG. 7. The inwardly extending portions 90 and 92 are spaced from the strut portions 86, as shown in FIG. 7, to accommodate a latch member 60", a portion of which is illustrated in FIG. 8. Through the arrangement illustrated in FIGS. 7 and 8, the spacer-expander provides circumferentially uniform outward radial pressures against the oil control ring 80 to bias the oil control ring into effective sealing engagement with the cylindrical bore surface 14".

The spacer-expander construction accommodates a latch member 60" in the same manner as the latch member 60 is accommodated in the arrangement shown in FIG. 3 for bridging the parted ends of the spacer-expander or spring 84. The struts 86 are in contiguous engagement with the inner cylindrical surface 81 of the oil control ring 80 throughout the circumference of the spacer-expander.

A method of fashioning the construction shown in FIG. 8 is illustrated in FIG. 9 wherein a strip or ribbon of metal, such as strip steel, is perforated or die cut to provide pairs of struts 86, the upper ends of which are integrally joined by connectors 87 and the lower ends integrally joined by connectors 88. The connectors 87 are shaped or bent to form an upper row of inwardly bent portions or projections 90, and the connectors 88 shaped or bent to form a lower row of inwardly bent portions or projections 92. The arrangement shown in FIGS. 7 and 8 comprises a spacer-expander or expander spring 84 which is inexpensive to manufacture and which accommodates a latch member 60".

It is apparent that, within the scope of the invention, modifications and different arrangements may be made other than as herein disclosed, and the present disclosure is illustrative merely, the invention comprehending all variations thereof.

I claim:

1. A spacer-expander ring for a piston ring construction comprising a parted ring body having a group of circumferentially-spaced strut sections, connectors arranged in two rows integrally joining the ends of adjacent pairs of strut sections, the connectors of the rows being bent inwardly toward one another whereby the connectors of one row are in staggered relation with respect to connectors of the other row, said rows of connectors forming a second group of sections, portions of the connector sections being radially spaced from portions of the strut sections, one of said groups of sections being arranged for radial engagement with a piston ring.

2. A spacer-expander ring construction according to claim 1 wherein portions of sections of one group of sections are arranged in substantial parallelism with the axis of the ring body.

3. A spacer-expander ring construction according to claim 1 wherein the strut sections are arranged for radial engagement with a piston ring.

4. A spacer-expander ring construction according to claim 1 wherein the connector sections of the second group are arranged for radial engagement with a piston ring.

5. A spacer-expander ring for a piston ring construction comprising a parted ring body having circumferentially-spaced strut sections providing a first group of sections, connectors arranged in two rows integrally joining the end regions of adjacent pairs of the strut sections, said connectors providing a second group of sections, the connectors of the rows being bent inwardly toward one another whereby the connectors of one row are in staggered relation with respect to connectors of the other row, said connectors terminating whereby there is no overlapping of the connectors, portions of sections of one group being arranged at acute angles with respect to portions of the sections of the other group, one of said groups of sections being arranged for engagement with a piston ring.

6. A piston ring construction including a spacer-expander ring for use with two sealing rings comprising a parted spacer-expander ring body having a group of circumferentially-spaced strut sections, connectors arranged in two rows integrally joining the end regions of adjacent pairs of strut sections, said connectors comprising another group of sections, the connectors of the rows being bent inwardly toward one another whereby the connectors of one row are in staggered nonoverlapping relation with respect to the connectors of the other row, portions of the sections of one group being arranged in substantial parallelism with the axis of the ring body, portions of the sections of the other group being arranged at acute angles with respect to portions of the sections of said one group, the angular portions of the sections of said other group being arranged for engagement with two sealing rings.

7. A piston ring construction including a spacer-expander ring for use with two sealing rings comprising a parted spacer-expander ring body having circumferentially-spaced strut sections, connectors arranged in two rows integrally joining the ends of adjacent pairs of strut sections, the connectors of the rows being bent inwardly and extending toward one another, the strut sections being arranged in substantial parallelism with the axis of the ring body, the connectors of the respective rows being arranged at acute angles with respect to the strut sections, the connectors of one row being arranged for engagement with one sealing ring, and the connectors of the other row being arranged for engagement with a second sealing ring.

8. A spacer-expander ring for use with piston rings comprising a parted ring body having a group of circumferentially-spaced strut sections, connector sections integrally joining the ends of adjacent pairs of strut sections forming a second group of sections, the sections of one group being arranged in substantial parallelism with the axis of the ring body, the sections of the other group being bent inwardly toward one another at acute angles with respect to the axis of the ring body, the acute angular sections being arranged in two rows, the acute angular sections of one row being arranged for radial engagement with one piston ring, and the acute angular sections of the other row being arranged for radial engagement with a second piston ring.

9. A spacer-expander ring for use with piston rings comprising a parted ring body including a group of circumferentially-spaced strut sections, connector sections arranged in two rows integrally joining the ends of adjacent pairs of strut sections forming a second group of sections, the connector sections of the rows being bent inwardly and extending toward one another in nonoverlapping relation, portions of the strut sections being arranged in substantial parallelism with the axis of the ring body, the connector sections of each row extending at acute angles with respect to the axis of the ring body, the angular connector sections of one row being arranged for engagement with one piston ring, and the angular connector sections of the other row arranged for engagement with a second piston ring.

10. A spacer-expander ring for use with piston rings comprising a parted ring body having circumferentially-spaced strut sections providing a first group of sections, an upper row of connector sections integrally joining the upper ends of adjacent pairs of strut sections, a lower row of connector sections integrally joining the lower ends of adjacent pairs of strut sections, said connector sections providing a second group of sections, the upper and lower connector sections being bent inwardly and extending toward one another and terminating whereby the connector sections of the upper and lower rows do not overlap, said connector sections of the upper and lower rows being radially spaced from the strut sections, one of said groups of sections arranged for radial engagement with two piston rings, the space between the groups of sections receiving a latch member arranged to bridge the ends of the parted ring body.

11. A spacer-expander ring according to claim 10 wherein the connector sections of the upper row are arranged for engagement with one piston ring, and the the connector sections of the lower row are arranged for engagement with a second piston ring.

* * * * *